UNITED STATES PATENT OFFICE.

EMIL F. NORELIUS, OF PEORIA, ILLINOIS, ASSIGNOR TO THE HOLT MANUFACTURING COMPANY, OF STOCKTON, CALIFORNIA, A CORPORATION OF CALIFORNIA.

TRANSMISSION MECHANISM.

1,356,734.   Specification of Letters Patent.   Patented Oct. 26, 1920.

Application filed November 8, 1918. Serial No. 261,632.

*To all whom it may concern:*

Be it known that I, EMIL F. NORELIUS, a citizen of the United States, residing at Peoria, in the county of Peoria and State of Illinois, have invented a new and useful Improvement in Transmission Mechanism, of which the following is a specification.

This invention relates to a motor vehicle construction and particularly pertains to a steering transmission for tractors.

The present invention is concerned with a driving and steering means for tractors, similar in operation to that disclosed in my co-pending application entitled Tractor transmission and which bears the filing date Sept. 17, 1918, and Ser. No. 254,443.

In transmission mechanisms of this particular type, it is desired to provide uninterrupted driving means for independently actuating the two driving units of a tractor and to furthermore provide power driven means adapted to be selectively controlled to vary the relative speeds of the two traction units, thereby eliminating the use of friction brakes and clutches and insuring that the steering of the vehicle may be effected with a minimum loss of power incident to the steering operation.

The present invention contemplates the use of a main driving shaft adapted to be driven at variable speeds through a set of speed changing gears and to impart motion to separately operated driving units, said main shaft being furthermore adapted to drive means for producing variable speeds of rotation for the two traction units driven thereby.

The invention is illustrated by way of example in the accompanying drawings in which—

Figure 1 is a view in side elevation, illustrating a completely assembled tractor upon which the transmission mechanism is utilized, the view further disclosing parts as broken away for the sake of clearness and convenience.

Fig. 2 is a view in longitudinal section as seen centrally of the transmission mechanism, particularly disclosing the speed changing gears and the steering clutches.

Fig. 3 is a fragmentary view and plan, illustrating the complete transmission mechanism with parts removed, to more clearly disclose the relation of the driving shafts with the axle of the separate traction units.

Fig. 4 is a view in transverse section and elevation, disclosing the driving axle of the traction units and the power transmission means in connection therewith.

Fig. 5 is a view in end elevation, disclosing one of the traction driving sprockets and the planetary gear arrangement in the end thereof.

Fig. 6 is a view in plan, illustrating the transmission mechanism as dissociated from the traction units and with parts broken away to disclose a modified form of steering transmission.

Referring more particularly to the drawings, 10 indicates a tractor main frame at the opposite sides of which are positioned truck roller frames 11. These frames are yieldably mounted to support the main frames by means of an equalizer mechanism 12 at their forward ends and spring members 13 interposed between their rear ends and the frame. As is customary, the frame members 11 provide mountings for load supporting rollers 14, which, in turn, bear upon the lower run of a track chain 15. The forward ends of the truck roller frames are fitted with idler sprockets 16, around which the chains pass while the opposite end of the chain passes around the driving sprockets 17. These sprockets are provided with their rotating axes in fixed relation to an axle 18, which is mounted transversely of the main frame and is rotatably supported within a transmission case 19. Each of these sprockets is formed with an internal ring gear 20, as particularly shown in Fig. 5. These gears are in constant mesh with a plurality of small planetary gear pinions 21, which are mounted for independent rotation upon the several arms of a gear spider 22. The gear spiders are free to rotate around the axis of the axle 18 and support the pinions 21 in mesh with the ring gears 20 and driving gears 23. These last named gears are fixed to the opposite ends of the axle 18 and impart motion to the sprockets from this axle.

UNITED STATES PATENT OFFICE.

ALICE J. PARKHURST, OF FLINT, MICHIGAN.

STOVE-MAT.

1,356,735.  Specification of Letters Patent.  Patented Oct. 26, 1920.

Application filed November 29, 1918. Serial No. 264,552.

*To all whom it may concern:*

Be it known that I, ALICE J. PARKHURST, a citizen of the United States, and a resident of the city of Flint, county of Genesee and State of Michigan, have invented certain new and useful Improvements in Stove-Mats, of which the following is a specification.

My invention relates to improvements in stove mats or covers, designed for use in connection with cooking utensils. The object of my invention is the production of a device of this character through the medium of which heat will be conserved in cooking, and burning of the material or substance cooked prevented. A further object is the production of a device of the character mentioned, which will be of durable and economical construction and efficient in use.

Other objects will appear hereinafter.

The invention consists in the combinations and arrangements of parts hereinafter described and claimed.

The invention will be best understood by reference to the accompanying drawings forming a part of this specification, and in which, Figure 1, is a partially sectional perspective view of a device embodying the invention, the cover thereof being shown in partly open position, and Fig. 2, a central section through the device.

The preferred form of construction, as illustrated in the drawings, comprises a comparatively thin flat body consisting of two shallow trays 3 and 4, having their backs or bottoms registering and secured together by rivets 5.

The upper tray 4 is provided with a removable cover 6, which is formed at opposite edges with flanges 7 adapted to slidably engage with flanges 8 provided at corresponding edges of said tray 4. The arrangement is such, as will be seen, that the cover 6 may be readily slid to and from position, the same being held in operative position through friction. Arranged in the bottom of tray 4 is a covering or layer 9 of asbestos, or other suitable non-heat conducting material, and arranged over said layer 9 is a layer of heat retaining material 10, common fine granulated table salt being preferably used for this purpose. At one side of the mat is provided a suitable handle 11.

In using the device, the same is placed above the burner over which the cooking is to be done. The depending flange at the under side of the device, which results in a concave formation, serves to retain the flame under the mat, preventing spreading beyond the edges thereof and thus utilizing to a maximum the heat thereof. The layers 9 and 10 prevent burning of the substance or material being cooked. The layer of salt, in addition, is adapted to retain the heat, rendering it necessary to maintain only a very low flame after the device has once been heated through. A saving of fuel is thus effected.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention, what I claim as new and desire to secure by Letters Patent is:—

A stove mat comprising a body formed of two comparatively shallow trays having their bottoms registering with each other and secured together; a cover for the open side of one of said trays; a downwardly projecting flange on the lateral edges of said cover, the lower portions of said flanges being turned inwardly and upwardly, said upwardly turned portions being engaged in a channel formed by a downwardly projecting flange on the lateral edges of said tray; and a filler of heat retaining material arranged in said last mentioned tray, substantially as described.

In testimony whereof I have signed my name to this specification in the presence of two subscribing witnesses.

ALICE J. PARKHURST.

Witnesses:
ELMA E. EASTON,
CLARA J. BUELL.